United States Patent [19]
Benson

[11] Patent Number: 5,636,473
[45] Date of Patent: Jun. 10, 1997

[54] UNDERGROUND SYSTEM FOR TREATING SOIL

[76] Inventor: William M. Benson, 3537 Pebble Beach Dr., Martinez, Ga. 30907

[21] Appl. No.: 243,294

[22] Filed: May 17, 1994

Related U.S. Application Data

[63] Continuation-in-part of Ser. No. 177,441, Jan. 5, 1994, Pat. No. 5,433,759.

[51] Int. Cl.⁶ ..................................................... A01G 1/04
[52] U.S. Cl. ............................................. 47/58; 47/1.01
[58] Field of Search ............................ 47/1.01, 1.01 F, 47/58.25, 17 EC, 19; 405/45, 36, 43

[56] References Cited

U.S. PATENT DOCUMENTS

| | | | |
|---|---|---|---|
| 3,470,943 | 10/1969 | Van Huisen | 47/19 |
| 3,521,699 | 7/1970 | Van Huisen | 47/19 |
| 4,293,237 | 10/1981 | Robey | 405/43 |
| 4,437,263 | 3/1984 | Nir | 47/19 |
| 5,120,158 | 6/1992 | Husu | 405/36 |
| 5,219,243 | 6/1993 | McCoy . | |

FOREIGN PATENT DOCUMENTS

| | | | |
|---|---|---|---|
| 2738133 | 3/1979 | Germany | 47/1 F |
| 2184333 | 6/1977 | United Kingdom | 47/17 EC |

*Primary Examiner*—Henry E. Raduazo
*Attorney, Agent, or Firm*—Harris Beach & Wilcox, LLP

[57] ABSTRACT

A method of treating the soil and turf of a golf course putting green that includes installing a gravel bed beneath the green and pumping air into the bed at a pressure such that the pressurized air is first distributed uniformly throughout the bed and then forced upwardly through the soil and turf of the green to treat the soil and turf.

4 Claims, 5 Drawing Sheets

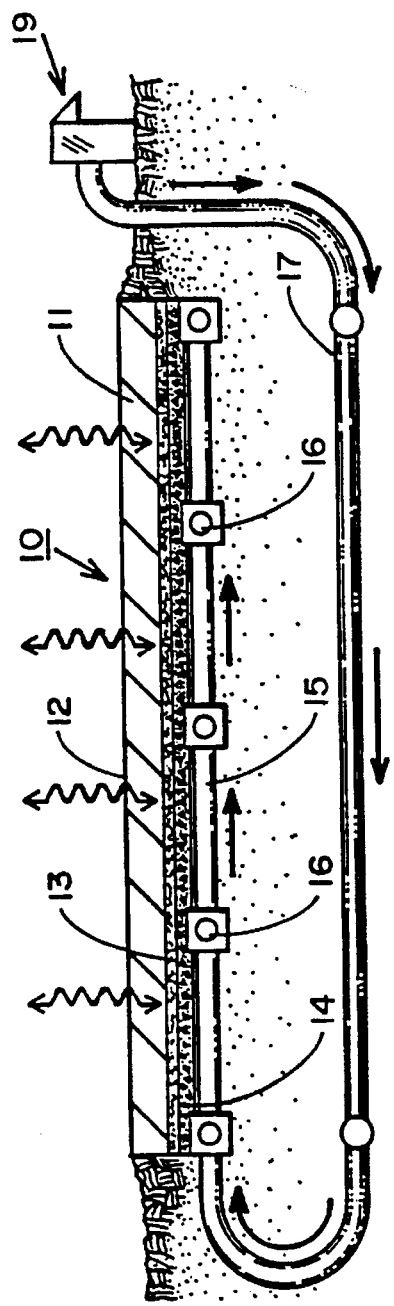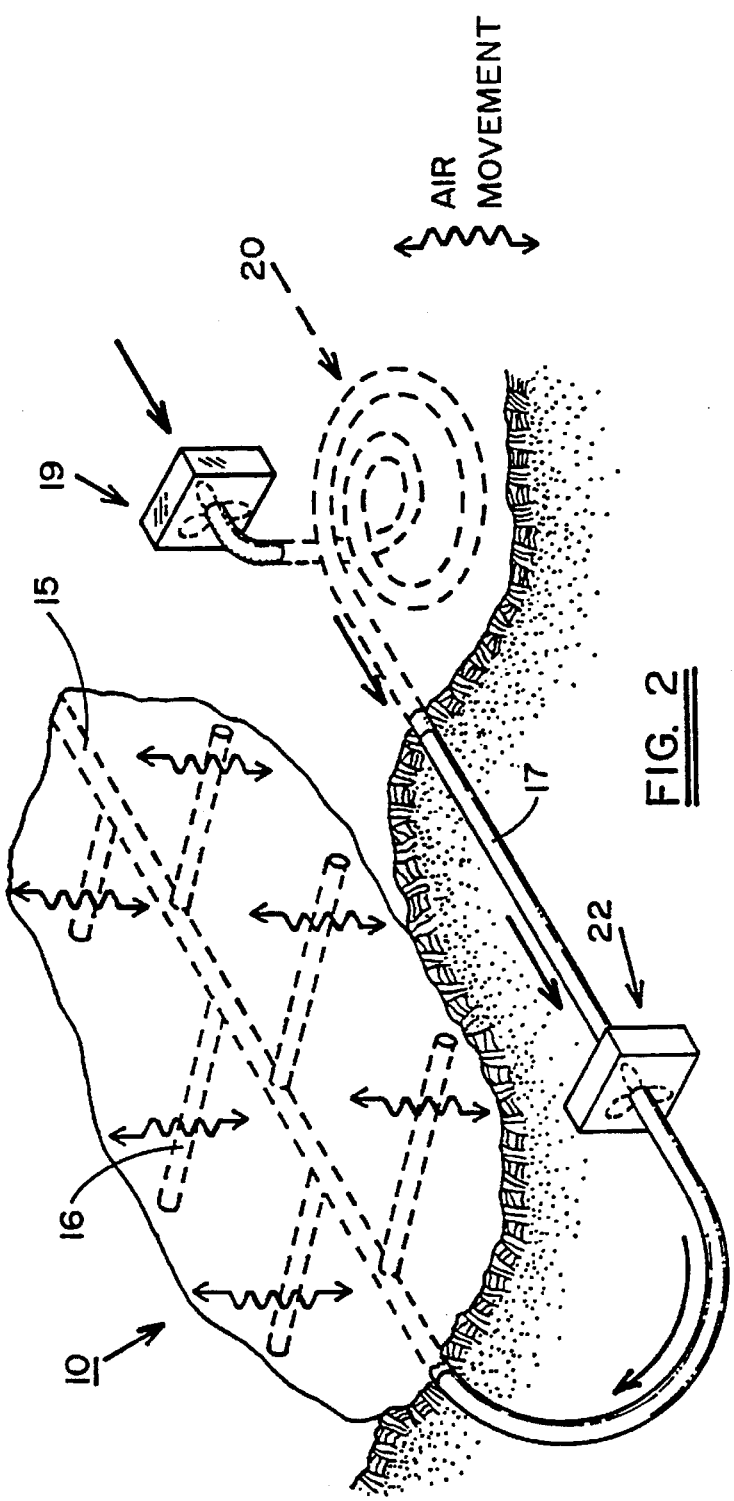
FIG. 1
FIG. 2

UNDERGROUND SYSTEM FOR TREATING SOIL

BACKGROUND OF THE INVENTION

This application is a continuation in part of patent application Ser. No. 08/177,441 filed Jan. 5, 1994 and now U.S. Pat. No. 5,433,759.

This invention relates to a method for treating turf and soil to control the temperature of the soil and maintain it and the turf in a condition to promote the growth and health of the turf.

The term turf as herein used refers to the upper layer of earth that is exposed to ambient air. The turf may be bare of vegetation or support grass or the like. The term subsoil or subsoil profile as herein used refers to one or more soil layers that are situated immediately below the turf and may be made up of natural or prepared layers of various constituents such as sand, gravel, and mixes containing organic and other substances that might promote the growth and well being of plant life. The term fluid as herein used may refer to either a gas or a liquid or a mixture of the two which is capable of treating soil to control the soil temperature.

In many soil related environments, it is important to maintain the soil and turf temperature at a desired level. One such application involves putting greens found on golf courses. The special grasses used in the construction of these greens are typically temperature sensitive and some grasses cannot tolerate even relatively small changes in temperatures outside of their adaptation range. Bent grasses used on some courses in southern states are native to more northern climates and cannot tolerate high summer temperatures and humidities. As a consequence, the grass will quickly wilt if special precautions are not taken to protect it. One such procedure is to move air over the green surface using rather large and noisy electric fans. Needless to say, the equipment involved is extremely expensive to both procure and operate and detracts from the game itself. Constant watering and syringing of the grass is also employed, however, this procedure is expensive, time consuming and not wholly satisfactory in that it increases the potential for onset and spread of plant disease. Heating the greens during cold periods has proven to be an even greater problem.

There are also other applications where it is important to maintain soil and turf temperatures within a desired range. One such application relates to brooder houses for poultry where the poultry is raised on bare turf. Poultry are susceptible to many diseases and are generally intolerant to climatic changes. Keeping the soil of these brooder houses at a desired temperature has long been a problem. Here again, different types of above and below ground heating systems have been employed with varying degrees of success.

SUMMARY OF THE INVENTION

It is a primary object of this invention to improve systems for treating soil and turf.

It is a further object of the present invention to provide an underground system for heating or cooling soil and subsoil profiles.

A still further object of the present invention is to improve methods for treating the soil of golf course putting greens.

It is a still further object of the present invention to oxygenate the soil profile of a golf course green.

Another object of the present invention is to improve the health of grass areas found on golf courses and outdoor playing fields.

Yet another object of the present invention is to retrofit existing golf course greens with a system for treating the soil of the green.

Still another object of the present invention is to provide a method for utilizing energy from the earth to heat or cool specific soil regions.

While another object of the present invention is to provide a method for heating and cooling golf course green that has the further capability of quickly drawing excess water from the soil of the green.

A further object of the present invention is to provide a method for heating and cooling a grassy area that has the further ability of providing nourishment to the grass.

These and other objects of the present invention are attained by installing a gravel bed beneath the soil and turf of a putting green, said gravel having particles of a size and shape such that interconnected interstices are provided between the particles. Ambient air is pumped into the bed to first fill the interstices with air and then push the air through the soil and turf of the green to uniformly aerate the green. In one form of the invention, oxygen is added to the air moving through the soil and turf.

BRIEF DESCRIPTION OF THE DRAWINGS

For a better understanding of these and other objects of the present invention, reference shall be made below to the detailed description of the invention which is to be read in association with the accompanying drawings, wherein:

FIG. 1 is a side elevation in section showing a golf course green embodying the teachings of the present invention for heating or cooling the green;

FIG. 2 is a perspective view in partial section showing a golf course green employing the heating and cooling system of the present invention that is equipped with a horizontally disposed ground source heat exchanger and an auxiliary blower;

DETAILED DESCRIPTION OF THE INVENTION

Figure 3:
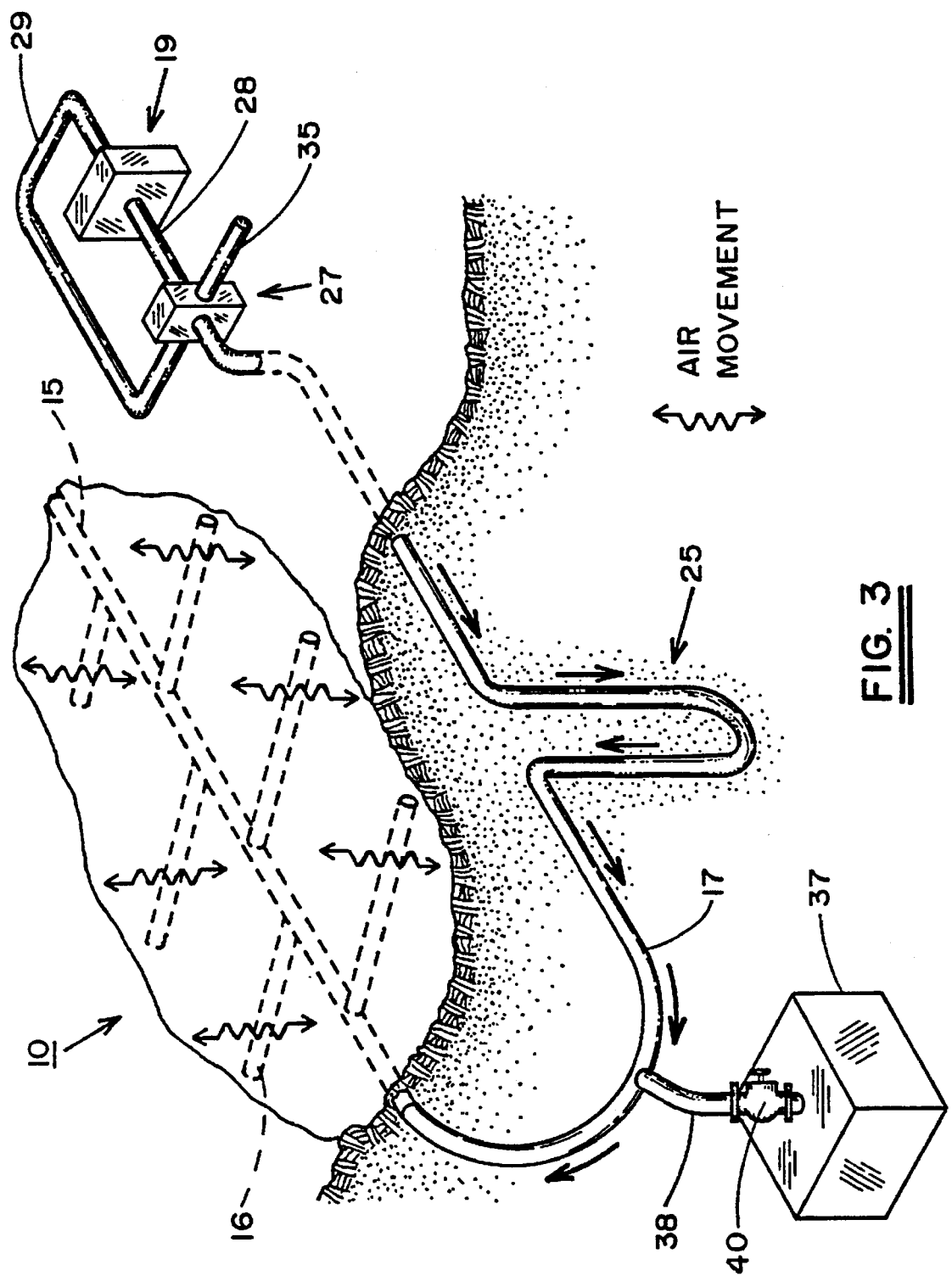
FIG. 3 is a further embodiment of the present invention employing a vertically disposed ground source heat exchanger.

Turning initially to FIG. 1, there is shown one form of the invention for heating or cooling a golf course green generally referenced 10. Although the present invention will be explained in detail with reference to the treatment of the turf and subsoil of a golf green, it should be clear that the present invention has wider application and can be used in any type of similar application. Outdoor sports stadiums having grass playing fields are examples of sites where underground soil treatment is desirous. Brooder houses for various types of poultry is a still further application where underground soil treatment is highly desirous for maintaining the health of the housed poultry.

The green depicted in FIG. 1 is one that has been constructed in compliance with the specifications of the United States Golf Association (USGA). The green includes a top layer 11 that supports a grass turf 12. The top layer is about twelve inches deep and contains a mix that is 80% fine sand and 20% organic matter which is typically peat moss. Immediately below the top layer is an intermediate layer 13 that is about two to four inches deep and contains choker sand. Finally, a lower layer 14 of pea gravel about four inches deep is placed directly below choker sand layer.

Typically, buried beneath the subsoil layer of the green is a duct network that is in communication with the pea gravel bed and serves to carry excess water in the subsoil region away from the green. The duct network includes one or more main perforated feeder lines 15 that are interconnected to a series of perforated distribution lines 16—16. The lines are arranged in a herringbone pattern that is dispersed beneath the surface of the green. The lines have openings that permit excess water in the soil to be collected in the lines. The lines are laid in the ground at an angle so that the collected water is gravity fed to the drainage system servicing the golf course. As will be explained in greater detail below, existing duct network can be easily retrofitted to provide an underground heating cooling system, capable of treating the subsoil and turf of the green.

As shown in FIG. 1, the main feeder lines 15 of the present system are connected to a supply ductwork 17 which, in turn, is connected to the outlet side of a blower 19. The horizontal section of the supply duct is buried between four and ten feet below the surface of the ground at a depth wherein the ground temperature is relatively constant and not readily responsive to changes in ambient air temperature.

The length of the horizontal section is such that sufficient energy is exchanged between the ground and the air moving through the ductwork to bring the air temperature close to the ground temperature. The horizontal section of the ductwork thus acts as a ground source heat pump to either heat or cool the air moving through the ductwork, depending upon the temperature of the ambient air that is drawn into the blower.

The blower can be located some distance from the green, preferably mounted below ground level to deaden any blower noise which might be distractful to golfers playing on the course. The blower is adapted to draw in ambient air and deliver it through appropriate lines to the duct network under the green. The air is pumped at relatively low pressure and at a high volume to prevent undue heating of the air and is distributed into the gravel bed by means of openings contained in the duct lines. The gravel in the bed is of a size and shape to provide interconnected interstices between the particles. Air is pumped into the bed at a predetermined pressure such that the interstices are completely filled with high pressure air before the air is driven upwardly through the overlying soil and turf layers. Tests have shown that the air entrapped in the gravel bed will be passed upwardly through the soil and turf and will eventually escape to the surrounding atmosphere to uniformly aerate the green. The system acts much like a balloon in that the balloon cavity (gravel bed) must be completely filled before outward pressure is exerted on the balloon envelope (the soil and turf layers). In this case, however, the soil is porous and the air penetrates the envelope before the envelope can expand.

In the event the ambient air temperature is relatively high, the air will be cooled as it moves through the heat exchanger section of the system thus providing cooling to the green. If the ambient air temperature is relatively low, the air moving through the system will be warmed by the ground effect thus providing heating to the green.

A prototype system was built and tested which proved that air moving through a system of the type herein described could be pushed upward through the subsoil profile of a green constructed in accordance with USGA specifications. An air tight housing five feet long, three feet wide and two feet nine inches deep was constructed and a four inch diameter feeder line was seated in the bottom of the housing. One end of the feeder line was blocked and the other attached to a blower. The feeder line was a typical drain pipe used in association with most existing greens. The line was covered with pea gravel and the gravel layer brought to about four inches over the top of the pipe. A three-and-one-half inch layer of choker sand was placed over the pea gravel and the choker sand covered with the twelve inches of an 80–20 USGA mix. The edge region between the walls of the housing and the layers of material were sealed to prevent air from flowing along the housing walls. The subsoil profile was watered and compacted.

The blower (New York Blower Model No. 1406A-3) was driven by a three horsepower Lesson motor (Cat. No. 13126300) and was attached to the four inch feeder line that was in communication with the subsoil profile by means of a four to six inch supply line. The top of the housing was closed by a cover frame surrounding a plastic film. The edges of the cover frame were then sealed.

The blower motor was started and ambient air discharged by the blower was metered into the four inch feeder line by opening a control valve in the supply line. Perched water that collected in the subsoil was observed through a window in the housing. The plastic film in the sealed cover became inflated clearly indicating that air from the blower was flowing freely through the subsoil profile. A colored fragrance was sprayed into the ambient air being drawn into the pump. The fragrance was clearly detected at the top of the soil profile and on the plastic film. Removal of a block in the end of feeder line further showed that positive pressure air was moving through the line.

Visual observations of the perched water showed that water did not impede the flow of air through the soil profile.

Temperature measurements of the subsoil were also taken during the test. Ambient air temperature was 38° F. The initial choker sand temperature was 45° F. and the USGA mix temperature was 41° F. at the mid depth level. After a short operating time, the temperature of the choker sand and the USGA mix equalized at about 40° F. showing that the soil profile was being cooled by the ambient air moving through the system. The test was repeated showing similar results.

FIG. 2 illustrates another embodiment of the invention wherein like numbers depict like elements as those described in reference to FIG. 1. Here again, air from a blower 19 is delivered to the feeder and distributing line 15 and 16 situated beneath the green by means of a supply line 17. A flat horizontally disposed heat exchanger coil 20 is connected between the supply line and the blower discharge. The coil is again buried at least four feet below ground level and provides a sufficient heat transfer surface so that the temperature of the air moving through the line will approach that of the earth surrounding the line. An auxiliary blower 22 is connected into the supply line downstream from the heat exchanger coil and serves to help push the treated air through the supply line. The auxiliary blower preferably is situated below ground to minimize heat loss and to suppress blower noise.

FIG. 3 illustrates a further embodiment of the invention wherein a vertically disposed heat exchanger 25 is operatively connected between the supply line 17 and the discharge side of the blower 19. The heat exchanger is a U-shaped line that is sunk to a depth well below that of the supply line into cooler regions of the earth for more efficient heat transfer. A four-way reversing valve unit 27 is positioned between the discharge line 28 of the blower and the heat exchanger for reversing the flow of air through the system.

Figure 6:
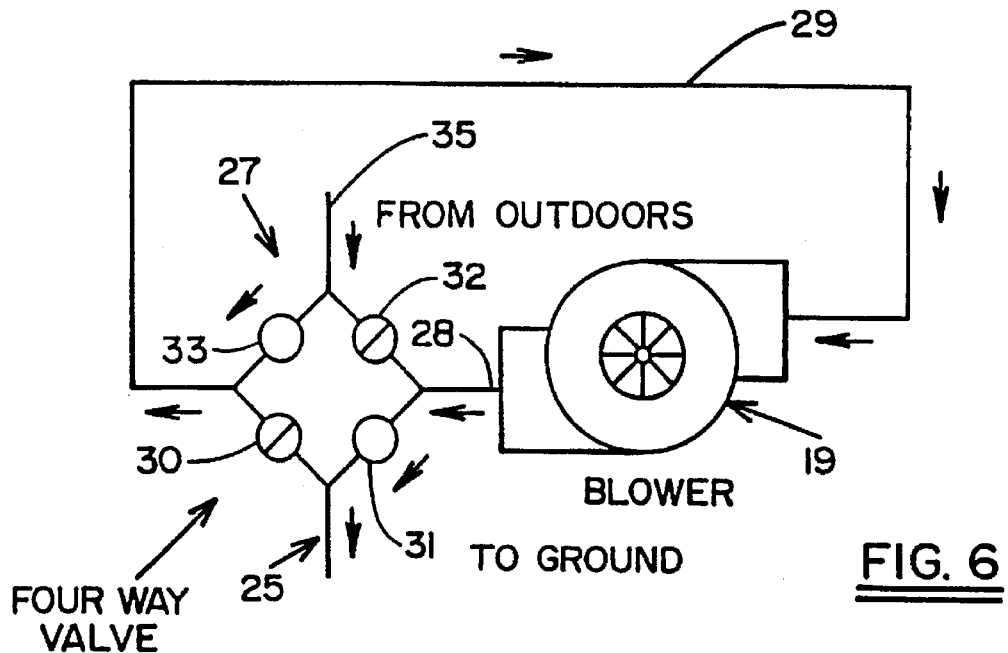
FIGS. 6 and 7 show apparatus for reversing the flow of air moving through the treatment system of the present invention.
Figure 7:
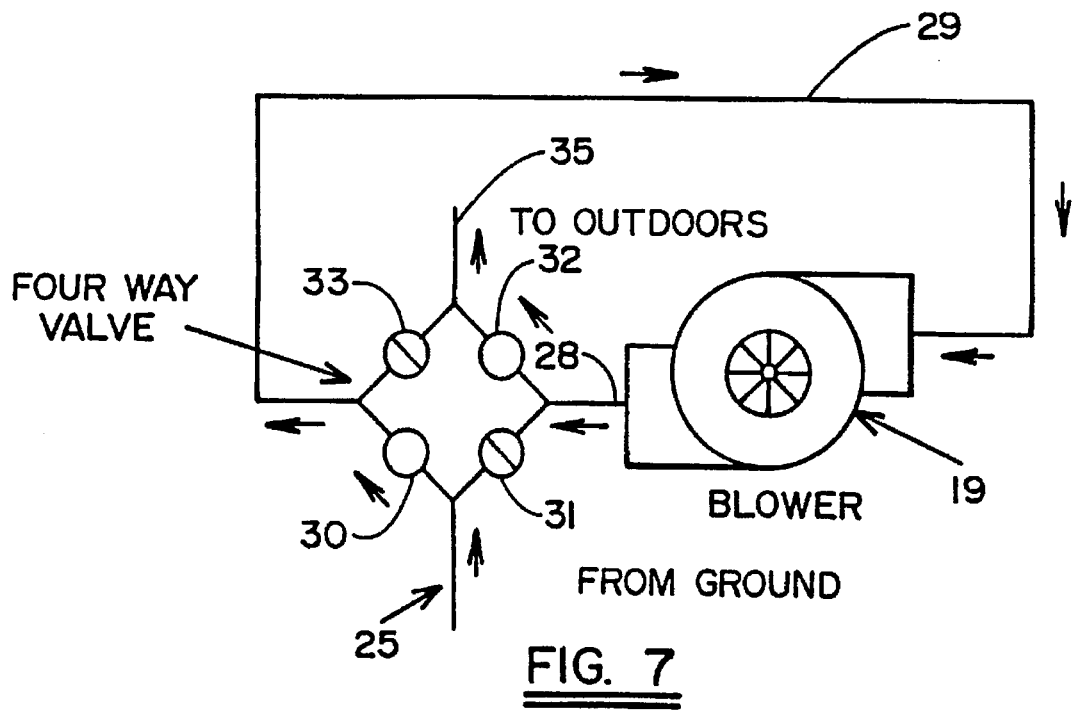

As illustrated in FIGS. 6 and 7, the reversing valve unit 27 contains four control valves 30–33 that are mounted in a bridge configuration. The entrance to the bridge is connected into the discharge line 28 of the blower. One pair of the bridge legs are connected to the heat exchanger 25 while the opposing pair of legs are connected to ambient air inlet by line 35. The exit to the bridge is connected to a return line 29 connected to the blower inlet. FIG. 6 depicts the valve positioning when the blower is providing cooling or heated air to the duct network under the turf. At this time valves 30 and 32 are closed and valves 31 and 33 are opened. Ambient air is delivered to the blower via the air inlet line 35 and the blower air discharge is pushed through the heat exchanger and the duct network.

Reversing the valve positions as shown in FIG. 7 places the inlet in communication with the heating and cooling system and its discharge in communication with ambient air. This in turn causes the blower to draw ambient air downwardly through the green soil profile. Any excess moisture or water in the subsoil is thus pulled into the duct network beneath the green. The network is arranged to drain into a sump 37 via a drain line 38 from which it is exhausted into the main drainage system servicing the golf course. A valve 40 is mounted in the drain line 38. The valve is closed when air is being pushed from the blower, and opened when the blower operation is halted.

Figure 4:
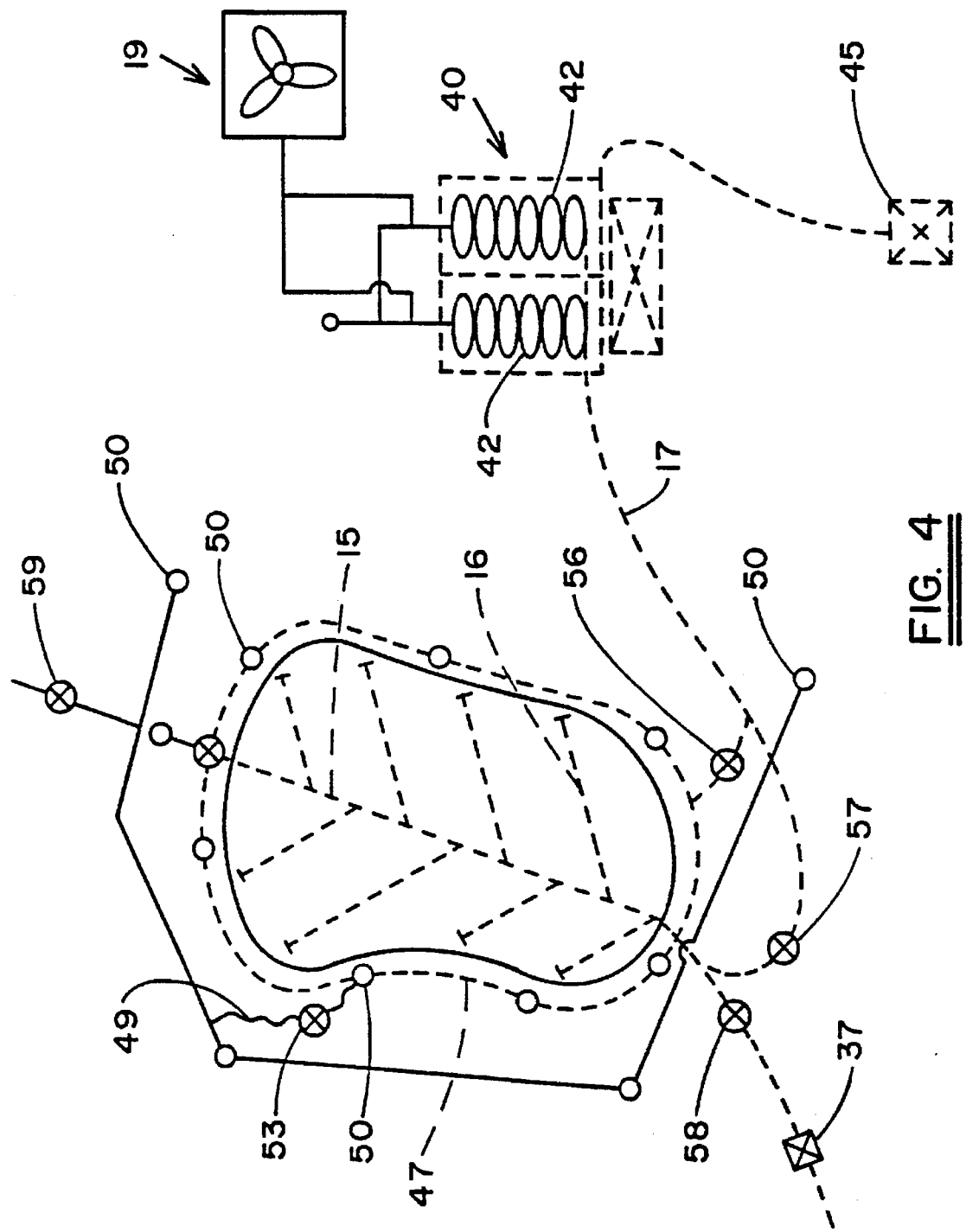
FIG. 4 is a further embodiment of the present invention having an alternate ground source circuit for cooling a golf green and a multiple circuit heat exchanger.

Turning now to FIG. 4, the outlet of blower 19 is connected to a multiple circuit heat exchanger 40. Each circuit 42—42 is a vertically disposed double helix line with the circuits being buried about ten feet below ground level. The circuits are connected in parallel flow relationship and each circuit is connected to a condensate drain sump 45. The outlet of the exchanger is coupled to the under green duct network via supply line 17 to provide heating or cooling to the soil profile.

An auxiliary pipe line 47 surrounds the periphery of the green and includes a series of spaced apart pop-up heads 50—50 of the type typically used around golf courses for distributing water above ground. The auxiliary line sprinklers are attached to the normal irrigation supply line 48 by a one-quarter inch fluid line 49 servicing the course. The heads are designed to be elevated by the air pressure and distribute air/water mist over the green surface.

A valve 53 is provided in the fluid line 49 that is operable to isolate the auxiliary pipe line 47 from the normal irrigation line 48. The auxiliary pipe line is coupled to the blower supply line 17 by a shunt line 55. A valve 56 is mounted in the shunt line and a second valve 57 is similarly mounted in the supply line downstream from the shunt line. The valves 56 and 57 can be cycled to deliver air from the blower to the pop-up head which can be modified to also distribute air as well as water over the surface of the green. Valve 53 can be opened at this time to supply both water and air to the heads. This, in turn, causes a fine mist to cover the green surface thus providing for more effective green cooling. A drain system 58 is tied into the under green duct network and functions as explained above to carry away excess moisture collected in the duct network.

Figure 5:
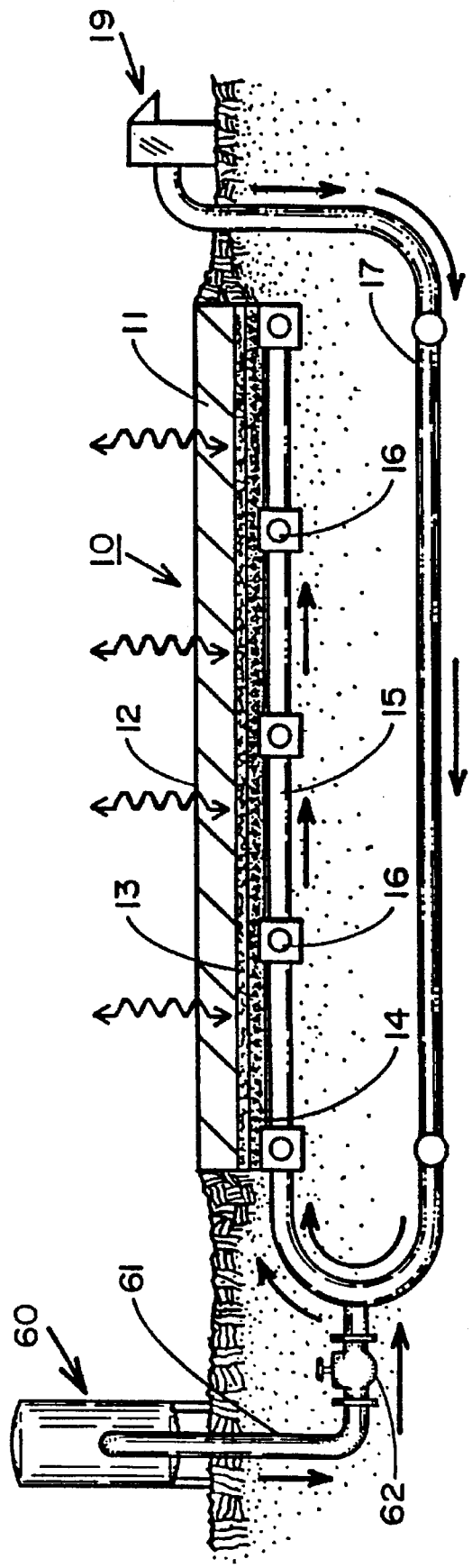
FIG. 5 is a still further embodiment of the invention wherein the system is able to nourish the turf and soil of a golf course green.

FIG. 5 illustrates a heating and cooling system that is similar to that described with reference to FIG. 1. Here again, the blower 19 pushes air through the supply line 17 into the under green duct network whereupon the air is forced upwardly through the soil profile. A pressurized tank 60 is mounted adjacent to the green and is connected into the supply line by means of a delivery line 61. A metering valve 62 is mounted in the delivery line. The tank may be used to store either gaseous or liquid materials for feeding and/or fortifying the soil or destroying unwanted pests and thus promote the growth and/or health of the grass. Opening the metering valve introduces the material into the air flow which, in turn, carries it upwardly through the subsoil profile where it is efficiently absorbed into the soil.

As should be evident from the disclosure above, the present system provides an effective means for treating subsoil regions to maintain the soil temperatures at desired levels. At the same time, the system can be utilized to promote drainage in these regions as well as providing for subsoil feeding and aeration. The system can be easily retrofitted to existing golf greens or other similar underground drainage systems or incorporated into new construction.

While this invention has been explained with reference to the structure disclosed herein, it is not confined to the details set forth and this invention is intended to cover any modifications and changes as may come within the scope of the following claims:

What is claimed is:

1. A method of promoting the health and well-being of grass turf on an unfrozen grass playing field by heating or cooling the grass, by the steps of providing a gravel bed beneath a soil profile of a grass playing field for distributing air uniformly beneath the playing field, placing a perforated pipe network in said gravel bed, providing an air blower having a suction inlet and a discharge outlet, and selectively connecting said perforated pipe network to the suction inlet of the blower to pull ambient air downwardly through the soil profile, and, alternatively, to the discharge outlet of the blower to push air upwardly through the soil profile to heat or cool the grass turf depending upon relative air and soil temperatures, wherein said suction inlet and said discharge outlet of said blower are selectively connected to said pipe network by a four-way valve.

2. The method of claim 1 that includes the further step of adding a material to the air moving through the system for further promoting the health of the grass turf that is being heated or cooled.

3. A method of promoting the health and well-being of grass turf on an unfrozen grass playing field by heating or cooling the grass, by the steps of providing a gravel bed beneath a soil profile of a grass playing field for distributing air uniformly beneath the playing field, placing a perforated pipe network in said gravel bed, providing an air blower having a suction inlet and a discharge outlet, and selectively connecting said perforated pipe network to the suction inlet of the blower to pull ambient air downwardly through the soil profile, and, alternatively, to the discharge outlet of the blower to push air upwardly through the soil profile to heat or cool the grass turf depending upon relative air and soil temperatures, and passing the air moving between the blower and the pipe network through a supply line beneath the ground so that energy is exchanged between air moving through the supply line and ground.

4. The method of claim 3 further including the step of burying the supply line at least four feet below ground level.

* * * * *